(12) United States Patent
Abe

(10) Patent No.: US 9,544,168 B2
(45) Date of Patent: Jan. 10, 2017

(54) CHANNEL ESTIMATION DEVICE, RECEIVING DEVICE, CHANNEL ESTIMATION METHOD, CHANNEL ESTIMATION PROGRAM, AND RECORDING MEDIUM

(71) Applicant: PIONEER CORPORATION, Kanagawa (JP)

(72) Inventor: Yoshinori Abe, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/893,941

(22) PCT Filed: Jun. 6, 2013

(86) PCT No.: PCT/JP2013/065649
§ 371 (c)(1),
(2) Date: Nov. 25, 2015

(87) PCT Pub. No.: WO2014/196046
PCT Pub. Date: Dec. 11, 2014

(65) Prior Publication Data
US 2016/0112218 A1    Apr. 21, 2016

(51) Int. Cl.
*H04J 11/00*    (2006.01)
*H04L 25/02*    (2006.01)
(Continued)

(52) U.S. Cl.
CPC ......... *H04L 25/0256* (2013.01); *H04B 7/0854* (2013.01); *H04L 5/0048* (2013.01); *H04L 27/2647* (2013.01); *H04L 27/38* (2013.01)

(58) Field of Classification Search
CPC .. H04L 25/0256; H04L 27/2647; H04L 27/38; H04L 5/0048
See application file for complete search history.

(56) References Cited

U.S. PATENT DOCUMENTS

| 8,045,610 B2 | 10/2011 | Wang |
| 2001/0022813 A1 | 9/2001 | Tan et al. |

(Continued)

FOREIGN PATENT DOCUMENTS

| JP | 59-115612 | 7/1984 |
| JP | H02-021715 | 1/1990 |

OTHER PUBLICATIONS

International Search Report—PCT/JP2013/065649—Jul. 9, 2013.
(Continued)

*Primary Examiner* — Dac Ha
(74) *Attorney, Agent, or Firm* — Young & Thompson

(57) ABSTRACT

A sum of products calculation of a predetermined tap number of tap data and a prescribed tap number of coefficients is carried out and a sum of the predetermined number of tap data is calculated. A replica signal is calculated on the basis of the sum of products calculation result, the sum of the tap data, and a correction coefficient. A residual signal is calculated as the difference between the replica and received signals. The predetermined tap number of coefficients is updated based on the predetermined tap number of tap data and the residual signal, and the correction coefficient calculated from the residual signal. Here, the tap data is either a data symbol before the superimposition of a DC component or an estimation thereof. This allows an adaptive FIR filter used in channel estimation of a received signal by a digitally modulated wave whereupon a DC component is superimposed.

20 Claims, 18 Drawing Sheets

(51) Int. Cl.
*H04B 7/08* (2006.01)
*H04L 5/00* (2006.01)
*H04L 27/26* (2006.01)
*H04L 27/38* (2006.01)

(56) References Cited

U.S. PATENT DOCUMENTS

| | | | | |
|---|---|---|---|---|
| 2008/0008261 A1* | 1/2008 | Baggen | ............... | H04L 25/022 375/296 |
| 2008/0219144 A1* | 9/2008 | Brehler | ............... | H04L 27/2695 370/203 |
| 2008/0219371 A1* | 9/2008 | Hong | ............... | H04L 25/022 375/260 |

OTHER PUBLICATIONS

Advance Television Systems Commitee, ATSC Technology Group Report: DTV Signal Reception and Processing Considerations—Doc. T3-600r4, Sep. 18, 2003.

* cited by examiner

<Normal Procedure>

Initial Condition, Initial processing $c_q(0), x_q(-1)$ are given for $q = 0, 1, \cdots, M-1$ Steady Processing (per Symbol) for $k = 0, 1, 2, \cdots$ $\{x_0(k), x_1(k), \cdots, x_{M-1}(k)\} = \{d(k) + p, x_0(k-1), \cdots, x_{M-2}(k-1)\}$ (1.1)

$r(k) = \sum_{q=0}^{M-1} c_q(k) x_q(k)$ (1.2)

$e(k) = r(k) - y(k)$ (1.3)

$c_q(k+1) = c_q(k) - \mu\, e(k)\, x_q(k)$ for $q = 0, 1, \cdots, M-1$ (1.4)

< Equivalent Procedure (1) >

Initial Condition, Initial processing $c_q(0), x_q(-1)$ are given for $q = 0,1,\cdots, M-1$ Steady Processing (per Symbol)   for $k = 0,1,2,\cdots$ $\{x_0(k), x_1(k), \cdots, x_{M-1}(k)\} = \{d(k), x_0(k-1), \cdots, x_{M-2}(k-1)\}$ (2.1)

$r(k) = \sum_{q=0}^{M-1} c_q(k)(x_q(k) + p) = \sum_{q=0}^{M-1} c_q(k) x_q(k) + p \sum_{q=0}^{M-1} c_q(k)$ (2.2)

$e(k) = r(k) - y(k)$ (2.3)

$c_q(k+1) = c_q(k) - \mu\, e(k)(x_q(k) + p)$   for $q = 0,1,\cdots, M-1$ (2.4)

Fig. 10

< Equivalent Procedure (2) >

Initial Condition, Initial processing $c_q(0), x_q(-1)$ are given for $q = 0, 1, \cdots, M-1$ $Sc(0) = \sum_{q=0}^{M-1} c_q(0)$ (3.6)

Steady Processing (per Symbol) for $k = 0, 1, 2, \cdots$ $\{x_0(k), x_1(k), \cdots, x_{M-1}(k)\} = \{d(k), x_0(k-1), \cdots, x_{M-2}(k-1)\}$ (3.1)

$r(k) = \sum_{q=0}^{M-1} c_q(k) x_q(k) + p Sc(k)$ (3.2)

$e(k) = r(k) - y(k)$ (3.3)

$c_q(k+1) = c_q(k) - \mu\, e(k)\, (x_q(k) + p)$ for $q = 0, 1, \cdots, M-1$ (3.4)

$Sc(k+1) = Sc(k) - \mu\, e(k) \sum_{q=0}^{M-1} (x_q(k) + p)$ (3.5)

Fig. 11

<Equivalent Procedure (3)>

Initial Condition, Initial processing $c_q(0), x_q(-1)$ are given for $q = 0,1,\cdots,M-1$ $$Sc(0) = \sum_{q=0}^{M-1} c_q(0) \quad (4.6)$$

Steady Processing (per Symbol) for $k = 0,1,2,\cdots$ $\{x_0(k), x_1(k), \cdots, x_{M-1}(k)\} = \{d(k), x_0(k-1), \cdots, x_{M-2}(k-1)\}$ (4.1)

$$Sx(k) = \sum_{q=0}^{M-1} x_q(k) \quad (4.7)$$

$$r(k) = \sum_{q=0}^{M-1} c_q(k) x_q(k) + pSc(k) \quad (4.2)$$

$e(k) = r(k) - y(k)$ (4.3)

$c_q(k+1) = c_q(k) - \mu\, e(k)(x_q(k) + p)$ for $q = 0,1,\cdots,M-1$ (4.4)

< Equivalent Procedure (4) >

Initial Condition, Initial processing

$c_q(0), x_q(-1)$ are given for $q = 0,1,\cdots,M-1$ $$Sc(0) = \sum_{q=0}^{M-1} c_q(0) \quad (5.6) \qquad Sx(-1) = \sum_{q=0}^{M-1} x_q(-1) \quad (5.8)$$

Steady Processing (per Symbol) for $k = 0,1,2,\cdots$ $\{x_0(k), x_1(k), \cdots, x_{M-1}(k)\} = \{d(k), x_0(k-1), \cdots, x_{M-2}(k-1)\}$ (5.1)

$Sx(k) = Sx(k-1) + d(k) - x_{M-1}(k-1)$ (5.7)

$$r(k) = \sum_{q=0}^{M-1} c_q(k) x_q(k) + pSc(k) \quad (5.2)$$

$e(k) = r(k) - y(k)$ (5.3)

$c_q(k+1) = c_q(k) - \mu\, e(k)\, (x_q(k) + p)$ for $q = 0,1,\cdots,M-1$ (5.4)

< Equivalent Procedure (5) >

Initial Condition, Initial processing

$c_q(0), x_q(-1) \quad are \quad given \quad for \; q = 0,1,\cdots,M-1$ $Sc(0) = \sum_{q=0}^{M-1} c_q(0) \quad (6.6) \qquad Sx(-1) = \sum_{q=0}^{M-1} x_q(-1) \quad (6.8)$ $b(0) = 0 \quad (6.10) \qquad a_q(0) = c_q(0) \quad for \; q = 0,1,\cdots,M-1 \quad (6.11)$

Steady Processing (per Symbol) $\quad for \; k = 0,1,2,\cdots$ $\{x_0(k), x_1(k), \cdots, x_{M-1}(k)\} = \{d(k), x_0(k-1), \cdots, x_{M-2}(k-1)\} \quad (6.1)$ $Sx(k) = Sx(k-1) + d(k) - x_{M-1}(k-1) \quad (6.7)$ $c_q(k) = a_q(k) + b(k) \quad for \; q = 0,1,\cdots,M-1 \quad (6.12)$ $r(k) = \sum_{q=0}^{M-1} c_q(k) x_q(k) + pSc(k) = \sum_{q=0}^{M-1} a_q(k) x_q(k) + b(k) Sx(k) + pSc(k) \quad (6.2) \qquad e(k) = r(k) - y(k) \quad (6.3)$ $a_q(k+1) = a_q(k) - \mu e(k) x_q(k) \quad for \; q = 0,1,\cdots,M-1 \quad (6.4)$ $b(k+1) = b(k) - \mu e(k) p \quad (6.9)$ $Sc(k+1) = Sc(k) - \mu e(k)(Sx(k) + pM) \quad (6.5)$

Fig. 14

<Equivalent Procedure (6)>

Initial Condition, Initial processing

$c_q(0), x_q(-1)$ are given for $q = 0,1,\cdots, M-1$ $$Sc(0) = \sum_{q=0}^{M-1} c_q(0) \quad (7.6) \qquad Sx(-1) = \sum_{q=0}^{M-1} x_q(-1) \quad (7.8)$$

$b(0) = 0 \quad (7.10) \qquad a_q(0) = c_q(0) \quad \text{for } q = 0,1,\cdots, M-1 \quad (7.11)$

Steady Processing (per Symbol) for $k = 0,1,2,\cdots$ $\{x_0(k), x_1(k), \cdots, x_{M-1}(k)\} = \{d(k), x_0(k-1), \cdots, x_{M-2}(k-1)\} \quad (7.1)$ $Sx(k) = Sx(k-1) + d(k) - x_{M-1}(k-1) \quad (7.7)$ $$u(k) = \sum_{q=0}^{M-1} a_q(k) x_q(k) \quad (7.0)$$

$r(k) = u(k) + b(k) Sx(k) + pSc(k) \quad (7.2)$ $e(k) = r(k) - y(k) \quad (7.3)$ $a_q(k+1) = a_q(k) - \mu e(k) x_q(k) \quad \text{for } q = 0,1,\cdots, M-1 \quad (7.4)$ $b(k+1) = b(k) - \mu e(k) p \quad (7.9)$ $Sc(k+1) = Sc(k) - \mu e(k)(Sx(k) + pM) \quad (7.5)$

Fig. 16

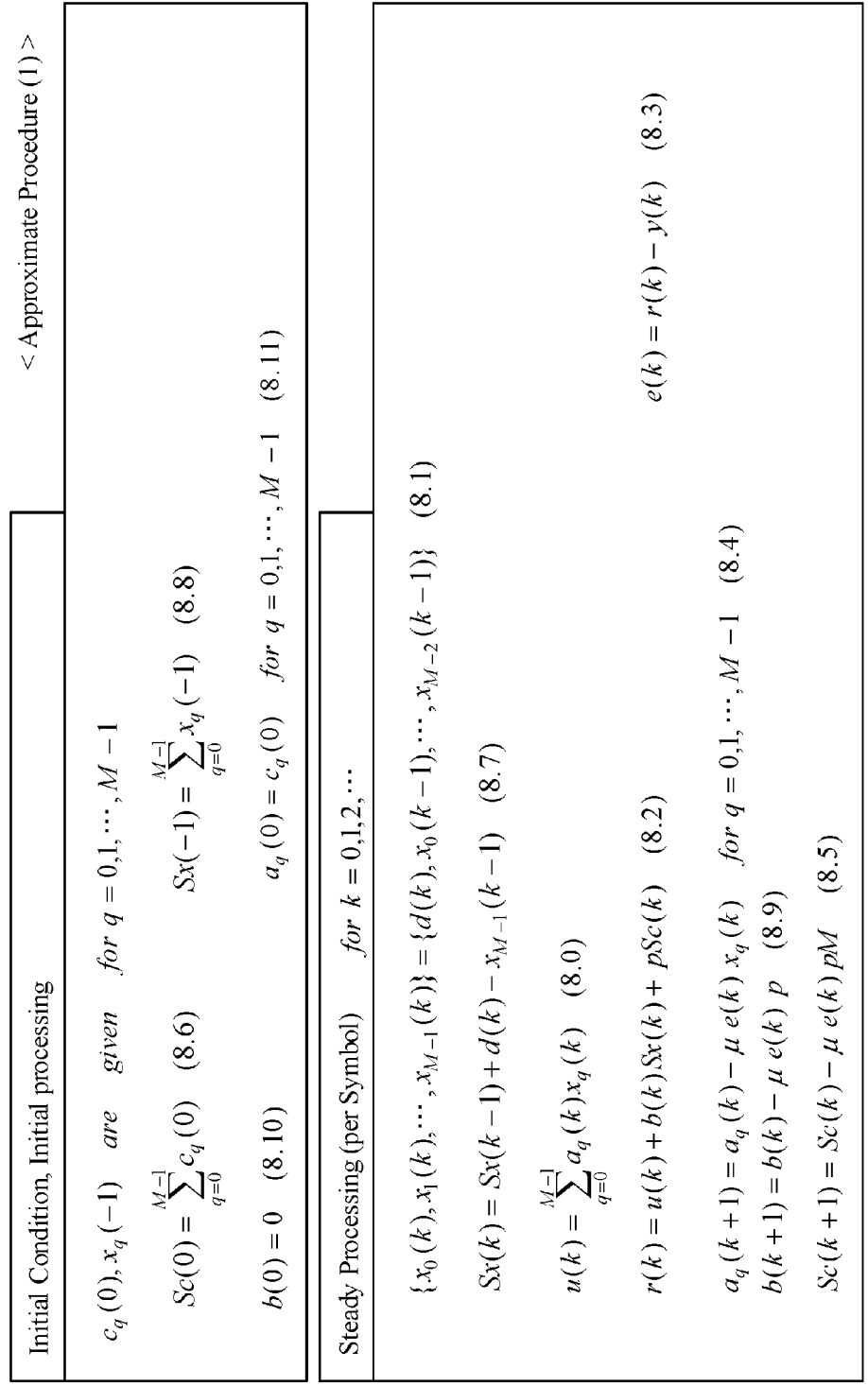

⟨Approximate Procedure (1)⟩

Initial Condition, Initial processing $c_q(0), x_q(-1)$ are given for $q = 0, 1, \cdots, M-1$ $Sc(0) = \sum_{q=0}^{M-1} c_q(0)$ (8.6)  $Sx(-1) = \sum_{q=0}^{M-1} x_q(-1)$ (8.8)

$a_q(0) = c_q(0)$ for $q = 0, 1, \cdots, M-1$ (8.11)

$b(0) = 0$ (8.10)

Steady Processing (per Symbol) for $k = 0, 1, 2, \cdots$ $\{x_0(k), x_1(k), \cdots, x_{M-1}(k)\} = \{d(k), x_0(k-1), \cdots, x_{M-2}(k-1)\}$ (8.1)

$Sx(k) = Sx(k-1) + d(k) - x_{M-1}(k-1)$ (8.7)

$u(k) = \sum_{q=0}^{M-1} a_q(k) x_q(k)$ (8.0)

$r(k) = u(k) + b(k) Sx(k) + p Sc(k)$ (8.2)

$e(k) = r(k) - y(k)$ (8.3)

$a_q(k+1) = a_q(k) - \mu e(k) x_q(k)$ for $q = 0, 1, \cdots, M-1$ (8.4)

<Approximate Procedure (3)>

Initial Condition, Initial processing

$c_q(0), x_q(-1)$ are given for $q = 0,1,\cdots,M-1$ $$Sc(0) = \sum_{q=0}^{M-1} c_q(0) \quad (10.6) \qquad Sx(-1) = pM + \sum_{q=0}^{M-1} x_q(-1) \quad (10.8)$$

$b(0) = 0 \quad (10.10) \qquad a_q(0) = c_q(0) \quad for\ q = 0,1,\cdots,M-1 \quad (10.11)$

Steady Processing (per Symbol) for $k = 0,1,2,\cdots$ $\{x_0(k), x_1(k), \cdots, x_{M-1}(k)\} = \{d(k), x_0(k-1), \cdots, x_{M-2}(k-1)\} \quad (10.1)$ $Sx(k) = Sx(k-1) + d(k) - x_{M-1}(k-1) \quad (10.7)$ $$u(k) = \sum_{q=0}^{M-1} a_q(k) x_q(k) \quad (10.0)$$

$r(k) = u(k) + b(k) Sx(k) + pSc(0) \quad (10.2) \qquad e(k) = r(k) - y(k) \quad (10.3)$ $a_q(k+1) = a_q(k) - \mu\, e(k)\, x_q(k) \quad for\ q = 0,1,\cdots,M-1 \quad (10.4)$ $b(k+1) = b(k) - \mu\, e(k)\, p \quad (10.9)$

Fig. 19

<Approximate Procedure (4)>

Initial Condition, Initial processing

$c_q(0), x_q(-1)$ are given for $q = 0,1,\cdots,M-1$     $\lambda = \mu\, p$    (11.12)

$Dc(0) = p\sum_{q=0}^{M-1} c_q(0)$    (11.6)     $Sx(-1) = \sum_{q=0}^{M-1} x_q(-1) + pM$    (11.8)

$b(0) = 0$    (11.10)      $a_q(0) = c_q(0)$   for $q = 0,1,\cdots,M-1$    (11.11)

Steady Processing (per Symbol)    for $k = 0,1,2,\cdots$ $\{x_0(k), x_1(k),\cdots, x_{M-1}(k)\} = \{d(k), x_0(k-1),\cdots, x_{M-2}(k-1)\}$    (11.1)

$Sx(k) = Sx(k-1) + d(k) - x_{M-1}(k-1)$    (11.7)

$u(k) = \sum_{q=0}^{M-1} a_q(k) x_q(k)$    (11.0)

$r(k) = u(k) + b(k) Sx(k) + Dc(0)$    (11.2)      $e(k) = r(k) - y(k)$    (11.3)

$a_q(k+1) = a_q(k) - \mu\, e(k)\, x_q(k)$   for $q = 0,1,\cdots,M-1$    (11.4)

$b(k+1) = b(k) - \lambda\, e(k)$    (11.9)

CHANNEL ESTIMATION DEVICE, RECEIVING DEVICE, CHANNEL ESTIMATION METHOD, CHANNEL ESTIMATION PROGRAM, AND RECORDING MEDIUM

TECHNICAL FIELD

The present invention relates to a channel estimation device, to a receiving device, to a channel estimation method and to a channel estimation program, and to a recording medium upon which such a channel estimation program is recorded.

BACKGROUND ART

In recent years, terrestrial digital broadcasting has spread worldwide. While there are a plurality of standards relating to terrestrial digital broadcasting, the ATSC (Advanced Television System Committee) standard is employed in the USA, Canada, Mexico, and South Korea. As modulation format, the ATSC standard employs 8 VSB modulation (8-ary Vestigial Sideband Modulation), which is a type of single carrier modulation.

Upon comparison of the ATSC standard with a standard that employs the multi-carrier modulation method of which the Japanese ISDB-T (Integrated Services Digital Broadcasting-Terrestrial) standard is representative, it has been pointed out that the multipath tolerance of the former is inferior. In particular, its dynamic multipath tolerance, which is required for mobile reception, is extremely low. Due to this, since the start of commercial broadcasting in 1998, no ATSC receiver has existed that, in a practice, has acceptable performance for use in a moving vehicle.

However in recent years, due to the progression of digital demodulation technology, the possibilities for mobile reception of ATSC signals have increased. For example, in Patent Document #1, a receiver configuration is disclosed that is based upon diversity reception and channel estimation.

It is per se known that diversity reception enhances the multipath tolerance. In such diversity reception, the reception performance is improved by combining signals received by a plurality of antennas.

And, a receiver configuration based on channel estimation technique is replacing a prior configuration based on an adaptive equalizer. With current ATSC receivers for fixed reception, a receiver configuration employing an adaptive equalizer has become widely used (refer to Non-Patent Document #1). However, with this prior art type of adaptive equalization technique, during mobile reception, it is difficult to track along a fast fading channel, and this situation is encountered quite often. In particular, the tracking speed gets lower in the case of a diversity receiver, with which it is also necessary to optimize the diversity combination coefficients, in addition to optimizing the equalization coefficients.

By contrast, with a receiver configuration that is based upon channel estimation, a channel impulse response (hereinafter "CIR") or a channel frequency response (hereinafter "CFR") is estimated for each diversity branch (hereinafter "branch"), and, by calculating the optimum diversity combination coefficients and equalization coefficients analytically on the basis of these estimations, it is possible to implement excellent tracking performance even for a fast fading channel.

PRIOR ART DOCUMENT

Patent Documents

Patent Document #1: U.S. Pat. No. 8,045,610

Non-Patent Documents

Non-Patent Document #1: DTV Signal Reception and Processing Considerations (ATSC document number T3-600r4)

SUMMARY OF THE INVENTION

Problem to be Solved by the Invention

However, no mention of any concrete technique for channel estimation is found in Patent Document #1.

Here, it is considered that an adaptive FIR filter (i.e. a LMSFIR) based upon an LMS (Least Mean Square) algorithm is employed for channel estimation.

An example of the configuration of an ATSC diversity-receiver employing an LMSFIR will now be explained in the following.

Note that, in the subsequent description, the following mathematical symbols are employed:

π, pi: the circle circumference-diameter ratio
j: the imaginary unit
real(x): the real part of the complex number x
imag(x): the imaginary part of the complex number x
arg(x): the argument of the complex number x
exp(x): the complex exponential function
conj(x): the complex number that is conjugate to the complex number x
a←b: update a with b In the following digital sequences and vectors, the following indices will be used without any particular mention. However, these index symbols will be omitted as appropriate, provided that there is no risk of error.

s: segment index
b: branch index
k: time index
c: frequency index
q: tap index

It will be supposed that an N-point FFT (Fast Fourier Transform) is given by the following Equation:

[Formula 1]

$$F(c) = \frac{1}{\sqrt{N}} \sum_{k=0}^{N-1} f(k) \exp(-2 \cdot \pi \cdot j \cdot c \cdot k / N) \quad (1)$$

Moreover, it will be supposed that an N-point IFFT (Inverse Fast Fourier Transform) is given by the following Equation:

[Formula 2]

$$f(k) = \frac{1}{\sqrt{N}} \sum_{c=0}^{N-1} F(c) \exp(2 \cdot \pi \cdot j \cdot c \cdot k / N) \quad (2)$$

Yet further, in the following description, an FFT without power normalization given by the following Equation will also be mentioned.

[Formula 3]

$$F(c) = \sum_{k=0}^{N-1} f(k)\exp(-2\cdot\pi\cdot j\cdot c\cdot k/N) \quad (3)$$

In this case, this will be explicitly described as an FFT without power normalization, in order to distinguish it from a normal FFT of the type mentioned above.

Block diagrams of an ATSC receiver 100 is shown in FIGS. 1 and 2. These block diagrams correspond to processing in the steady state. Generally, initial processing (acquisition) is performed before steady processing is performed. In this initial processing, establishment of frame synchronization and calculation of initial coefficients for an adaptive filter that will be described hereinafter are performed.

First, the overall configuration of the receiver will be explained with reference to FIG. 1. The receiver comprises four antennas 1#b (where b=0,1,2,3; and the same hereinafter), four front ends (FEDs) 2#b corresponding respectively to these antennas, four branch processors (BPRs) 3#b respectively corresponding to the antennas in a similar manner, a combination unit (CMB) 4, an equalization unit (EQ) 5, an IFFT unit (IFFT) 6, a trellis decoder (TRD) 8, and a back end (BED) 9. Note that, while the number of branches in the example is postulated as being four, a similar receiver configuration with a different number of branches would also be possible.

Each of the front ends extracts a component of the desired channel from the time-continuous RF (Radio Frequency) signal that is inputted from the corresponding antenna, and converts this to a complex baseband signal (hereinafter this is termed a "CBB signal") which is a discrete time sequence, and outputs the CBB signal. Typically, the front end performs processing such as RF filtering, frequency conversion to IF (Intermediate Frequency), IF filtering, A/D conversion, frequency conversion to baseband, sampling frequency conversion, and so on. Here, it will be supposed that the modulation frequency of the CBB signal is zero. And, it will be supposed that the sampling frequency of the CBB signal is synchronized to the symbol transmission rate (around 10.76 MHz).

Moreover, it will be supposed that, in the CBB signal, the VSB spectrum is located on the positive frequency side, as shown in FIG. 3.

Each of the functional blocks of the example performs block units processing (hereinafter termed "segment processing") in synchronization with "Segment" prescribed by the ATSC standard. As a result of a single segment processing, an equalized signal having the length of a segment, in other words 832 symbols long, is outputted from the IFFT unit.

Each of the branch processors performs processing upon the CBB signal that is inputted thereto, and, in the processing of each segment, calculates the received signal spectrum (hereinafter termed the "RSS"), an estimate of the CFR (hereinafter termed the "estimated CFR"), and an estimation of the noise power spectrum (hereinafter termed the "estimated NPS"). The RSS and the estimated CFR are N-point complex vectors, while the estimated NPS is an N-point real number vector. Here, N is the number of points of the FFT, and is supposed to be 2048 in the example. The vectors calculated in the processing of the s-th segment (where s=0, 1, 2 . . . ) by the b-th branch processor (3#b in FIG. 1) are expressed as follows. Note that the details of the branch processors will be described hereinafter.

$$\text{RSS:}\{Yb,s(c):c=0,1,\ldots,N-1\} \quad (4)$$

$$\text{Estimated CFR:}\{Hb,s(c):c=0,1,\ldots,N-1\} \quad (5)$$

$$\text{Estimated NPS:}\{Zb,s(c):c=0,1,\ldots,N-1\} \quad (6)$$

The combination unit combines the RSSs outputted from the branch processors on the basis of the estimated CFRs and the estimated NPSs. The combination is performed according to the maximal ratio combining rule for each frequency bin. More specifically, the combined spectrum $\{Ds(c)\}$ is calculated according to the following Equation:

[Formula 4]

$$D_s(c) = \sum_{b=0}^{3} \frac{\text{conj}(H_{b,s-1}(c))Y_{b,s}(c)}{Z_{b,s-1}(c)} \quad \text{for} \quad (7)$$

$$c = 0, 1, \Lambda, N-1$$

Please attract the attention of the reader to the fact that, for the estimated CFR and the estimated NPS, the values calculated in the previous segment processing, in other words in the (s−1)th segment processing, are used. Moreover, it is assumed that the estimated CFR and the estimated NPS that are used for combination in the first segment processing (s=0) are calculated in advance on initial processing.

The equalization unit performs equalization according to the MMSE (Minimum Mean Square Error) rule. First, the equalization unit calculates the frequency response $\{Qs(c)\}$ after combination according to the following Equation:

[Formula 5]

$$Q_s(c) = \sum_{b=0}^{3} \frac{|H_{b,s-1}(c)|^2}{Z_{b,s-1}(c)} \quad \text{for} \quad (8)$$

$$c = 0, 1, \Lambda, N-1$$

Subsequently, the equalization unit calculates the equalized spectrum $\{V(c)\}$ according to the following Equations. Here, $\sigma^2=21$ is the variance of the transmitted data symbols. Note that the symbols for the segment index are omitted.

[Formula 6]

$$J(c)=Q(c)+Q(-c)+1/\sigma^2 \text{ for } c=0 \quad (9)$$

[Formula 7]

$$J(c)=Q(c)+Q(N-c)+1/\sigma^2 \text{ for } c=1,2,\Lambda,N-1 \quad (10)$$

[Formula 8]

$$V(c)=D(c)/J(c) \text{ for } c=0,1,\Lambda,N-1 \quad (11)$$

First, the IFFT unit extracts the central portion of 832 points in the complex vector of 2048 points obtained by performing an IFFT upon the equalized spectrum, while omitting its leading 608 points and its trailing 608 points.

And then, the IFFT unit outputs to the trellis decoder an equalized signal that is obtained by subtracting a pilot component of 1.25 from the real parts of these extracted points.

The trellis decoder performs Viterbi decoding upon the equalized signal outputted from the IFFT unit. The decoded bit sequence is provided to the back end. Moreover, the trellis decoder provides decision values to the branch processors. The sequence of decision values is calculated as the trellis encoder output sequence that corresponds to the maximum likelihood survivor path. The decision values are values that give estimations of the transmitted symbols before pilot superimposition, and their values are equal to one of the eight integer values {±1, ±3, ±5, ±7 }.

Note that symbols that are not trellis encoded (i.e. non-encoded symbols) are also inputted to the trellis decoder. For example, the first four symbols of each segment are the DSS (Data Segment Sync) prescribed by the ATSC standard, and the values thereof that have been transmitted are already known to be {5, −5, −5, 5}. Moreover, the first segment of the ATSC field includes a plurality of reserve bits. These reserve bits are not trellis encoded, and it is stipulated that the values thereof are only specified either 5 or −5. The trellis decoder of the example does not perform Viterbi decoding if the input symbol corresponds to a non-encoded symbol of this type. And, if the input symbol corresponds to an already known, then the transmitted symbol value is used as its decision value. Furthermore, if the input symbol corresponds to a reserve bit, then the hard decision result obtained with a two-value slicer is used as its decision value.

The back end performs a series of decoding processes; concretely, it performs deinterleaving, Reed-Solomon decoding, derandomization, processing of various types, and outputs an MPEG transport stream (MPEG-TS) that is obtained as a result. The MPEG-TS is converted to video and audio by appropriate decoding processing.

The branch processors will now be explained. A block diagram of the interior of one branch processor is shown in FIG. 2. Each of the branch processors comprises a data distribution unit (DST) 11, an RSS calculation unit (FFT) 12, a CFR estimation unit (CFRE) 13, and an NPS estimation unit (NSPE) 14.

In each segment processing, the data distribution unit extracts sectional signals from the CBB signal and provides them to the RSS calculation unit and to the CFR estimation unit. The sectional signal of 832 points that has been extracted so that there are no gaps or overlapping on the CBB signal is provided to the CFR estimation unit. In other words, if the CBB signal is taken to be {cbb(k)}, then the sectional signal that is provided to the CFR estimation unit in the s-th segment processing is {cbb(k): ko+832s≤k<ko+832s+831}. Here, the value of ko is determined by the initial processing. On the other hand, a sectional signal of 2048 points (the number of points N in the FFT) is provided to the RSS calculation unit, with overlap interval of 608 points each being added before and after the interval provided to the CFR estimation unit.

The RSS calculation unit calculates the RSS by performing a FFT upon the 2048 point section signal provided from the data distribution unit for each segment processing.

The CFR estimation unit estimates the CFR for each branch on the basis of the CBB signal provided from the data distribution unit and the decision values provided from the trellis decoder, and provides the results to the combination unit. Moreover, it provides the residual signal obtained together with the estimation is provided to the NPS estimation unit.

The configuration of the CFR estimation unit is shown in FIG. 4. This CFR estimation unit comprises a CIR estimation unit (CIRE) 21 and a coefficient transformation unit (CTR) 22.

The CIR estimation unit is configured as a per se known adaptive FIR filter. Now, this per se known adaptive filter and the CIR estimation that employs it will be explained. A typical configuration for an adaptive filter is shown in FIG. 5. As shown in the figure, the adaptive filter comprises a variable coefficient filter (VFL) 31 and a coefficient updating unit (CUD) 32. Generally, an adaptive filter requires two input signals. One of these is the main input signal that is inputted to a variable coefficient filter, while the other is a reference input signal that gives the desired filter output. The coefficient updating unit updates the filter coefficients so that the filter output signal becomes closer to the desired filter output signal. In more detail, on the basis of a residual signal which is the difference between the actual filter output signal and the reference input signal, the coefficient updating unit updates the filter coefficients so that the power of this residual signal becomes low.

The decision values provided from the trellis decoder are sent to the adaptive FIR filter of the example as the main input signal. Moreover, the CBB signal provided from the data distribution unit is sent as the reference input signal. As previously described, the adaptive FIR filter updates the coefficient vector of the FIR filter adaptively so that the FIR filter output becomes closer to the reference input signal. As a result, the coefficient vector provides an estimated value of the CIR.

The details of the processing performed by the adaptive FIR filter of the example will now be explained in the following. It will be supposed that, in the processing of some segment, the CBB signal provided from the data distribution unit is {y(k): k=0, 1, . . . , 831} and the sequence of the decision values provided from the trellis decoder is {d(k): k=0, 1, . . . , 831}. And it will be supposed that the tap length of the adaptive FIR filter is 512, the coefficient vector is {c(q): q=0, 1, . . . , 511}, and the tap vector is {x(q): q=0, 1, . . . , 511}. At this time, the processing of the adaptive FIR filter for each symbol is given by the following Equations:

$$\{x(0), x(1) \ldots x(511)\} \leftarrow \{d(k), x(0) \ldots x(510)\} \quad (12)$$

$$r(k) = c(0)x(0) + c(1)x(1) + \ldots + c(511)x(511) \quad (13)$$

$$e(k) = r(k) - y(k) \quad (14)$$

$$c(q) \leftarrow c(q) - \mu e(k)x(q) \text{ for } q=0,1 \ldots 511 \quad (15)$$

Equation (12) shows the shift processing for the tap vector. By using Equation (13), the output r(k) of the adaptive FIR filter is calculated as being the sum of products of the coefficient vector and of the tap vector. It is considered that the filter output r(k) calculated in this manner is a replica of the received signal. By using Equation (14), the residual signal e(k) is calculated as being the difference between the replica signal r(k) and the actually received CBB signal. And, in Equation (15), the coefficient vector is updated according to the LMS algorithm. Due to this updating, the power of the residual signal is minimized. In other words, the differential power between the actually received signal and the replica signal is minimized. Note that $\mu$, is the updating step. With the adaptive FIR filter of this example, the processing described above is performed 832 times in the processing of each segment, in other words for k=0, 1, . . . , 831. The residual signal {e(k): k=0, 1, . . . , 831} is provided to the NPS estimation unit.

It will be supposed that the initial value of the coefficient vector is calculated by the initial processing. The initial value may be calculated by any one of various methods; for example, it could be calculated on the basis of correlation between the CBB signal and the PN511 sequence prescribed by the ATSC standard.

The coefficient transformation unit calculates the estimated CFR on the basis of the coefficient vector $\{c(q): q=0, 1, \ldots, 511\}$ at the time point that the adaptive FIR filter has completed the segment processing described above.

In concrete terms, the coefficient transformation unit calculates the estimated CFR according to the following Equations:

$$\{c'(q):c=0,1 \ldots 2047\}=\{c(0),c(1), \ldots, c(511),0,0,0,\ldots\} \tag{16}$$

$$\{H'(c):c=0,1,\ldots,2047\}=\text{FFT}(\{c'(q)\}) \tag{17}$$

$$\text{if}(1024+59 \leq c \leq 2048-59): H(c)=0, \text{else}: H(c)=H'(c) \tag{18}$$

According to Equation (16), the coefficient vector is extended to an N-point vector by zero padding. Then, by using Equation (17), the frequency response $\{H'(c)\}$ of the adaptive FIR filter is calculated by performing an N-point FFT (without power normalization) upon the extended coefficient vector. Moreover, by using Equation (18), the estimated CFR $\{H(c)\}$ provided to the combination unit is calculated by forcibly setting terms in $\{H'(c)\}$ that correspond to outside the 6 MHz channel band to zero. Please attract the attention of the reader to the fact that the estimated CFR calculated here is used by the combination unit in the next segment processing.

The NPS estimation unit estimates the NPS on the basis of the residual signal provided from an adaptive FIR filter.

As shown in FIG. 6, the NPS estimation unit comprises a windowing unit (WIN) 41, a zero padding unit (ZPD) 42, a Fourier transformation unit (FFT) 43, a norm calculation unit (NRM) 44, a power correction unit (CRR) 45, and an averaging unit (AVR) 46.

The windowing unit performs a windowing upon the residual signal of the 832 symbols $\{e(k): 0, 1, \ldots, 831\}$ provided from the adaptive FIR filter for the processing of each segment. A raised cosine window, a Hamming window, a Blackman window or the like may be employed as the windowing function. For example, if a raised cosine window is employed, then the windowing may be performed according to the following Equation:

$$e'(k)=\text{wind}(k) \cdot e(k) \text{ for } k=0,1,\ldots,831 \tag{19}$$

Here, e'(k) is the signal after windowing, and wind(k) is the raised cosine window function given by the following Equation:

[Formula 9]

$$\text{wind}(k) = \sqrt{8/3} \frac{1-\cos(2\pi k/832)}{2} \tag{20}$$

The zero padding unit performs zero padding upon the back end of the signal after windowing, and extending it to N (2048) points.

The Fourier transformation unit performs an N-point FFT upon the output of the zero padding unit.

The norm calculation unit calculates a norm value for each of the N-point complex numbers calculated by the FFT.

The power correction unit corrects the power, which has been reduced by the zero padding, by multiplying the norm values by (2048/832).

The averaging unit calculates the estimated NPS by averaging the corrected norm values. The averaging may, for example, be implemented with a first order IIR filter. In this case, taking the norm values after power amendment as being $\{G_S(c): c=0, 1, \ldots, N-1\}$, the estimated NPS $\{Z_S(c): c=0, 1, \ldots, N-1\}$ is calculated according to the following Equation:

$$Z_S(c)=Z_{S-1}(c)+\gamma(G_S(c)-Z_{S-1}(c)) \tag{21}$$

Here, $\gamma$ is the IIR filter coefficient. The fact should be noted that the estimated NPS calculated here is used by the combination unit in the next segment processing.

An example of the configuration of an ATSC receiver has been explained above. By configuring the receiver in this manner, it becomes possible to perform mobile reception of an ATSC signal, which was considered to be impossible in the prior art. However with this configuration, as will now be explained, there is the problem that the amount of calculation by the adaptive FIR filter becomes great.

Generally, it is usual for the level of calculation by an adaptive FIR filter that is employed for channel estimation to be small. This originates in the fact that each of the elements in the tap vector is an estimation of a transmitted symbol. For example, if the pilot component is zero, then each of the elements of the tap vector is one of the eight integer values $\{\pm1, \pm3, \pm5, \pm7\}$. These values can be expressed accurately with the small number of bits by four bits (including a sign bit). Accordingly, performing multiplication 512 times and including the sum of products calculation of Equation (13), or performing multiplication 512 times and including the coefficient updating calculation of Equation (15), does not require a large amount of calculation.

However, actually, each of the elements in the tap vector is one of the eight integer values $\{\pm1, \pm3, \pm5, \pm7\}$ with the DC offset of 1.25 added to it, this being the pilot component. Six bits (including a sign bit) are necessary for expressing these values. As a result, the amount of calculation by the adaptive FIR filter becomes great.

The object of the present invention is to implement an adaptive FIR filter to be used in channel estimation by an ATSC receiver with a small amount of calculation. More generally, the object of the present invention is to implement an adaptive FIR filter to be used in channel estimation with the small amount of calculation, even if a DC offset is superimposed upon the transmitted symbols.

Means for Solving the Problems

When viewed from a first standpoint, the present invention is a channel estimation device to which a received signal of a digitally modulated wave upon which a predetermined DC component is superimposed is inputted, comprising: a sum of products calculation unit performing sum of products calculation of a predetermined plural tap number of items of tap data and said predetermined tap number of coefficients; a tap sum total calculation unit calculating the sum total of said predetermined tap number of items of tap data; a replica calculation unit calculating a replica signal on the basis of said sum of products calculation result, said tap data sum total, and a correction coefficient; a residual calculation unit calculating a residual signal as the difference between said replica signal and said received signal; a coefficient updating unit updating said predetermined tap number of coefficients on the basis of said predetermined tap number of items of tap data and said residual signal; and a correction coefficient calculation unit calculating said correction coefficient on the basis of said residual signal, wherein said tap data is either a data symbol before superimposition of said DC component, or an evaluation thereof.

And, when viewed from a second standpoint, the present invention is a receiving device, comprising a channel estimation device according to the present invention.

Moreover, when viewed from a third standpoint, the present invention is a channel estimation method that is used by a channel estimation device to which a received signal of a digitally modulated wave upon which a predetermined DC component is superimposed is inputted, the channel estimation method comprising the steps of: performing a sum of products calculation of a predetermined plural tap number of items of tap data and the same predetermined tap number of coefficients; calculating the sum total of said predetermined tap number of items of tap data; calculating a replica signal on the basis of said sum of products calculation result, said tap data sum total, and a correction coefficient; calculating a residual signal as the difference between said replica signal and said received signal; updating said predetermined tap number of coefficients on the basis of said predetermined tap number of items of tap data and said residual signal; and calculating said correction coefficient on the basis of said residual signal, wherein said tap data is either a data symbol before superimposition of said DC component, or an estimation thereof.

Furthermore, when viewed from a forth standpoint, the present invention is a non-transient computer readable medium having recorded thereon a channel estimation program that, when executed, causes a computer in a channel estimation device, to which is inputted a received signal of a digitally modulated wave upon which a predetermined DC component has been superimposed, to execute the diversity reception method according to the present invention.

BRIEF DESCRIPTION OF DRAWINGS

FIG. 10 is a figure showing a procedure that is equivalent modification of the procedure shown in FIG. 9;

FIG. 11 is a figure showing a procedure that is equivalent modification of the procedure shown in FIG. 10;

FIG. 12 is a figure showing a procedure that is equivalent modification of the procedure shown in FIG. 11;

FIG. 13 is a figure showing a procedure that is equivalent modification of the procedure shown in FIG. 12;

FIG. 14 is a figure showing a procedure that is arranged from the procedure shown in FIG. 13;

FIG. 16 is a figure showing an approximate procedure that is very similar to the procedure shown in FIG. 14;

FIG. 18 is a figure showing a procedure that is equivalent modification of the procedure shown in FIG. 17; and FIG. 19 is a figure showing a procedure that is equivalent modification of the procedure shown in FIG. 18.

EMBODIMENTS FOR CARRYING OUT THE INVENTION

Figure 1:
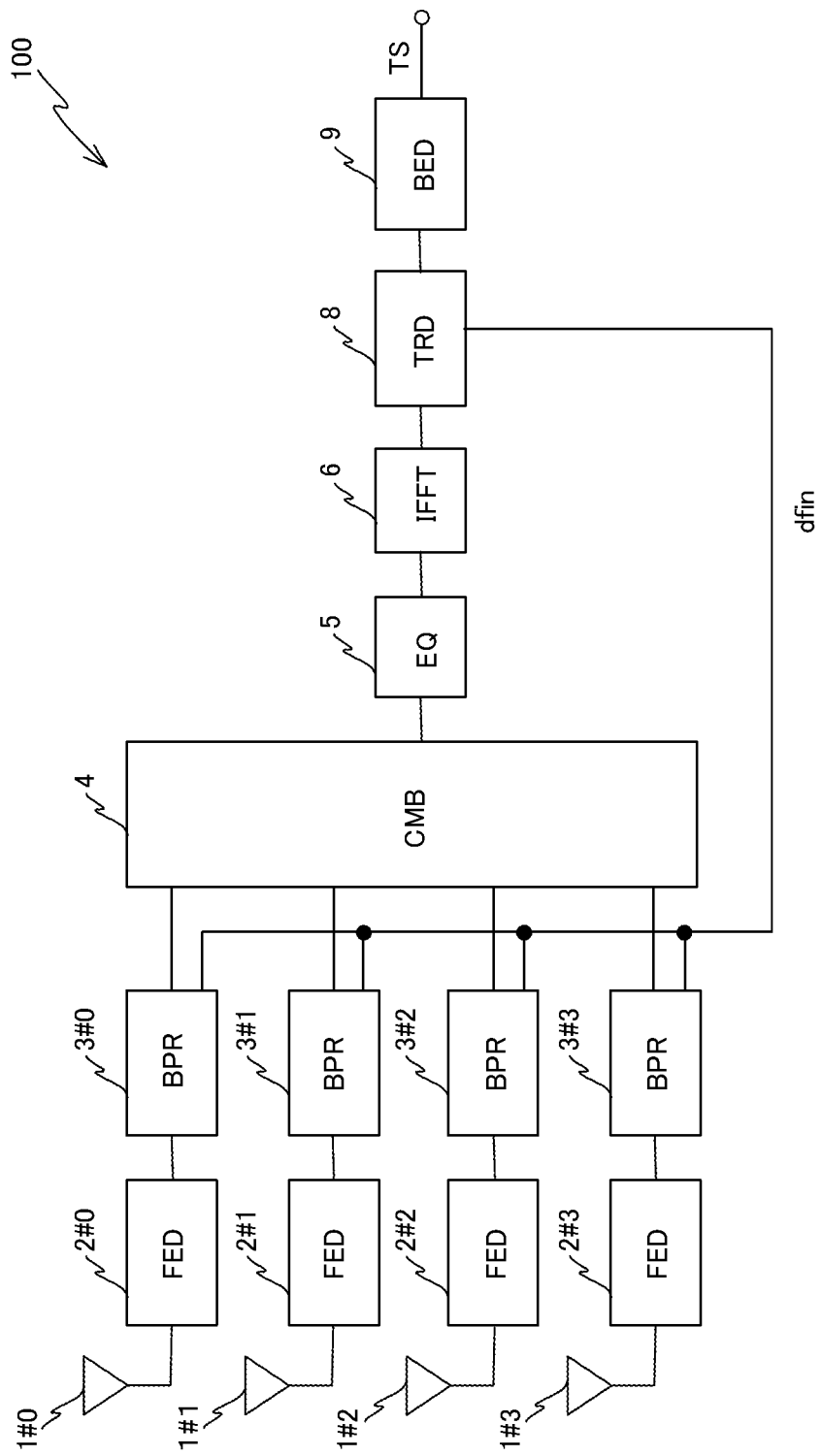
FIG. 1 is a block diagram schematically showing the configuration of an ATSC receiver.
Figure 2:
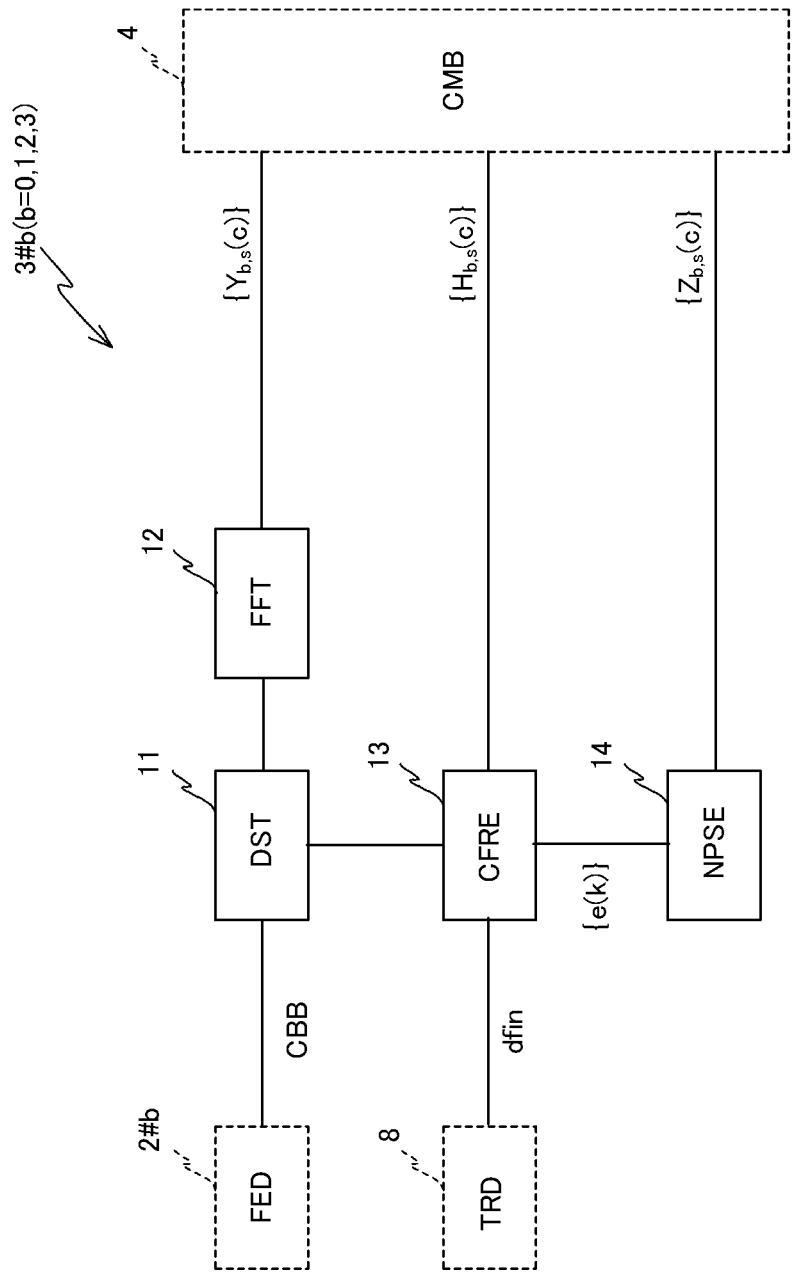
FIG. 2 is a block diagram of a branch processor (BPR) in FIG. 1.
Figure 3:
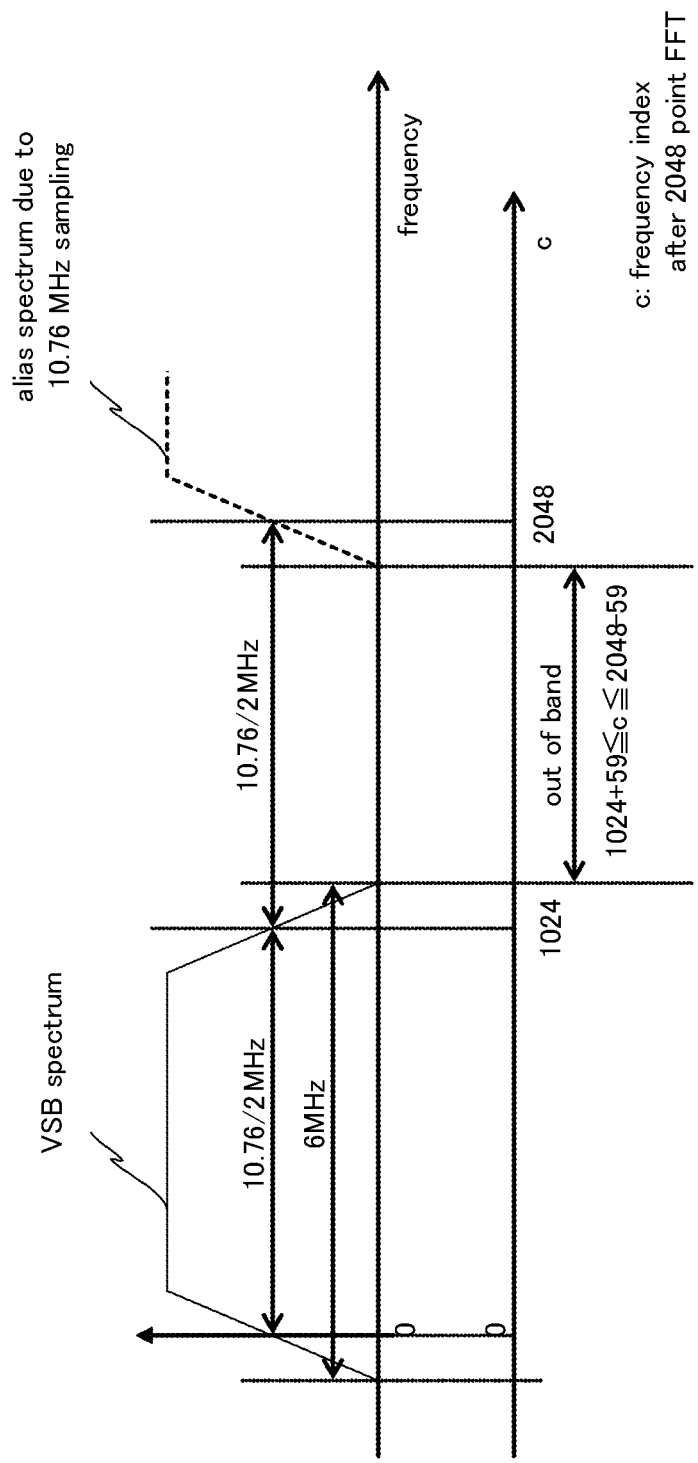
FIG. 3 is a figure for explanation of a VSB spectrum.
Figure 4:
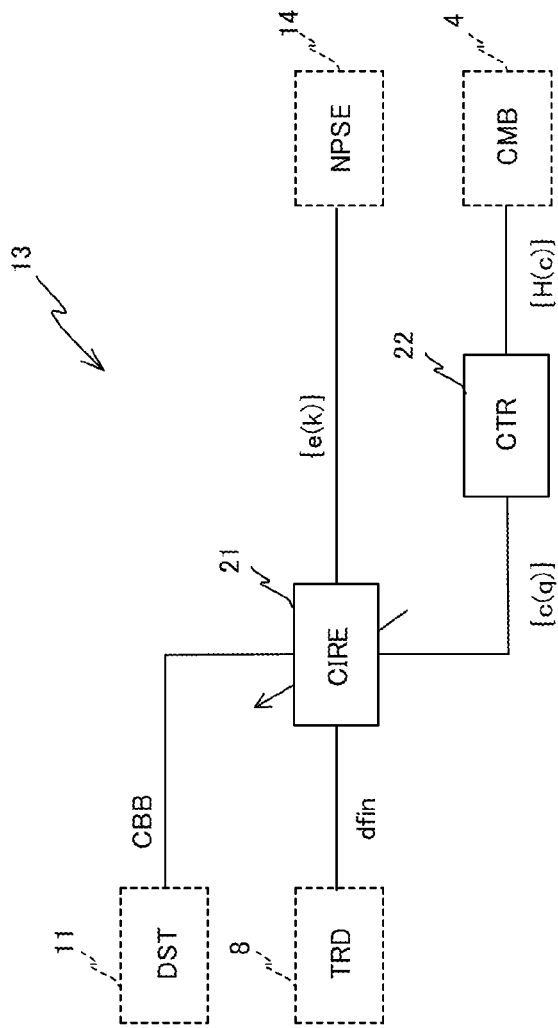
FIG. 4 is a block diagram of a CFR estimation unit (CFRE) in FIG. 2.
Figure 5:
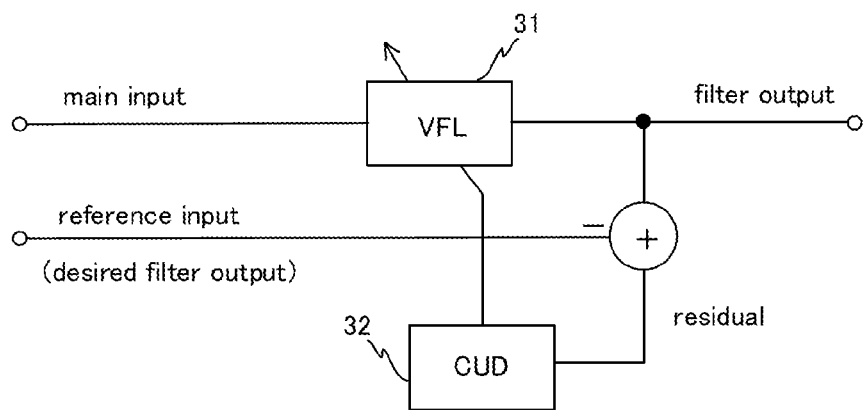
FIG. 5 is a block diagram schematically showing the configuration of a conventional adaptive FIR filter.
Figure 6:
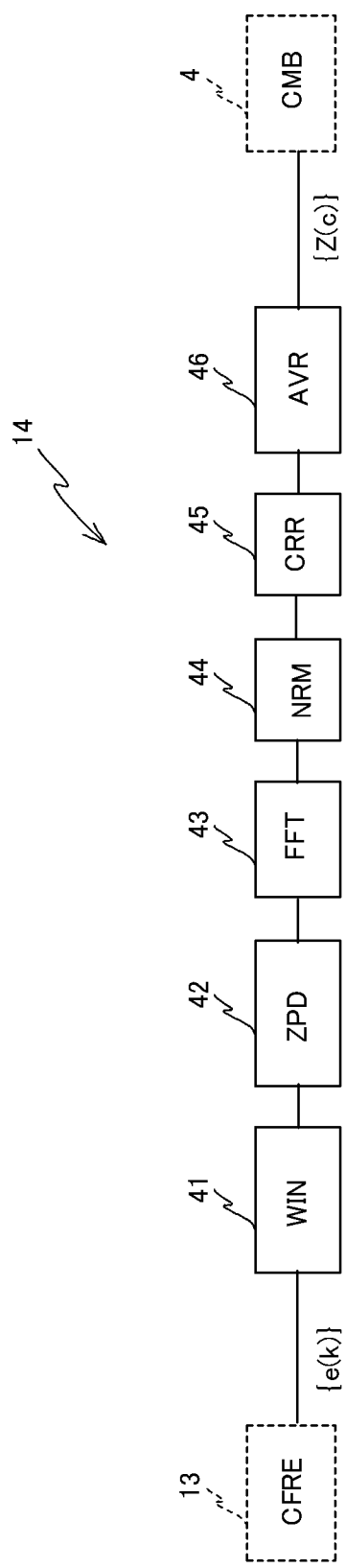
FIG. 6 is a block diagram of an NPS estimation unit (NPSE) in FIG. 2.
Figure 7:
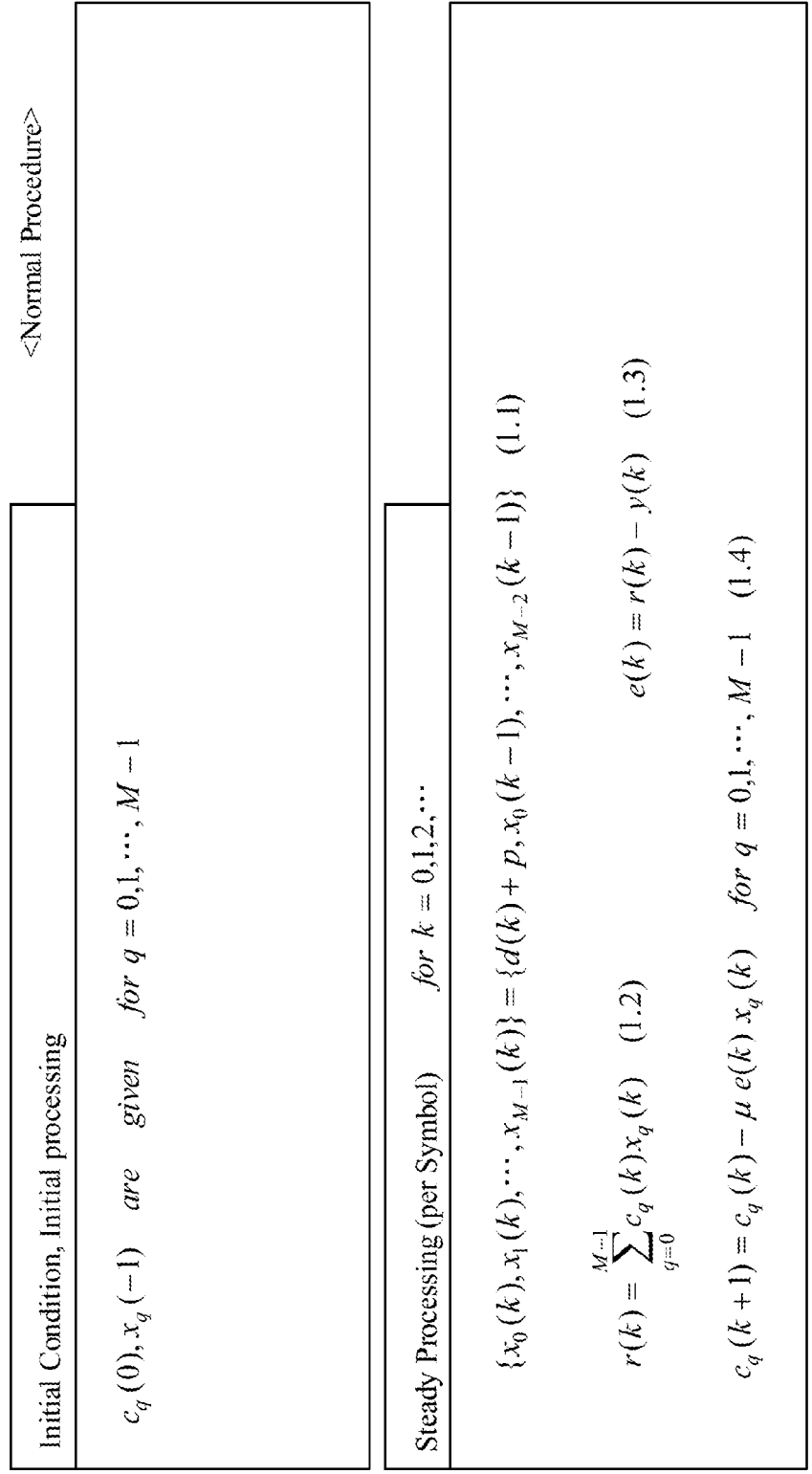
FIG. 7 is a figure showing a procedure by a prior art adaptive FIR filter.
Figure 8:
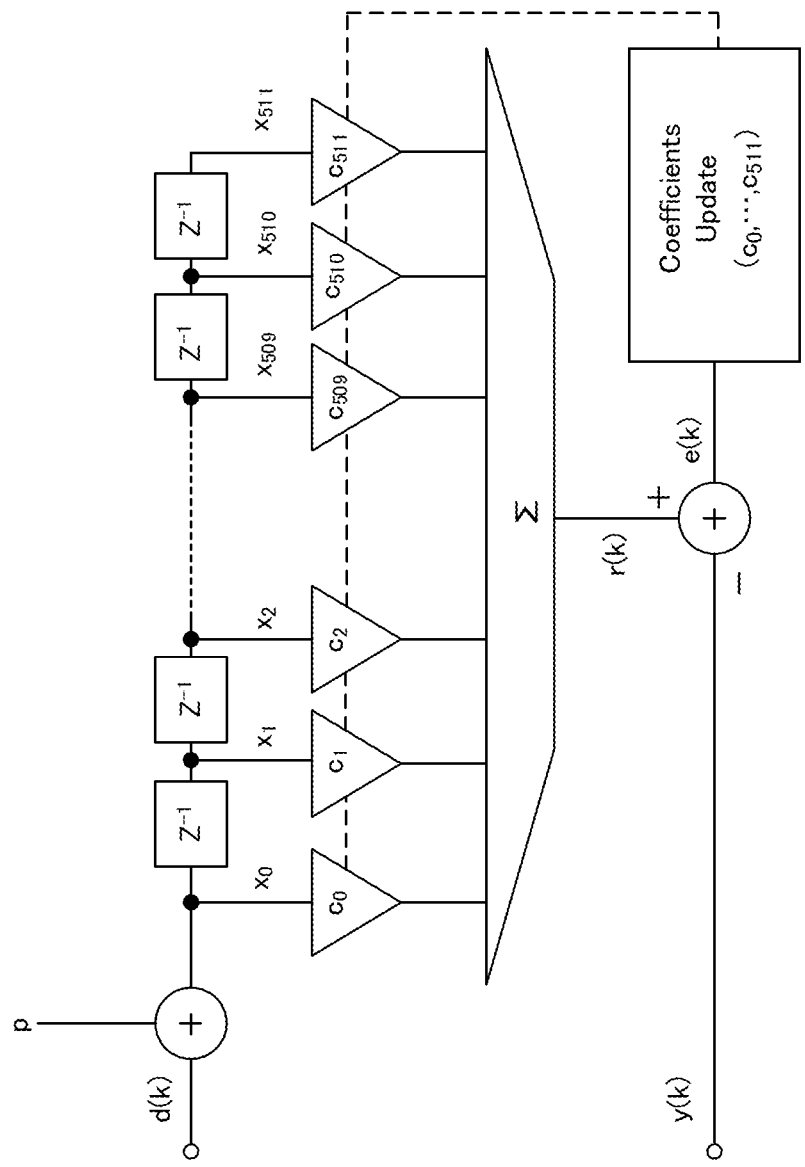
FIG. 8 is a figure showing a configurational example when the procedure shown in FIG. 7 has been implemented by hardware.

A generalized procedure performed by the adaptive FIR filter that has been explained using Equations (12) through (15) is shown in FIG. 7. Here, M is the tap number and p is the DC offset. Equation (1.1) represents the shift processing of the tap data, Equation (1.2) represents the sum of products calculation of the tap vector and the coefficient vector, Equation (1.3) represents the calculation of the residual, and Equation (1.4) represents the coefficient updating. Note that these Equations are executed in the following order: from above to below, and from left to right. For reference, an example of the configuration is shown in FIG. 8, when procedure shown in FIG. 7 is implemented in hardware (i.e. with logic circuits).

In the following, reduction of the amount of calculation is anticipated by modifying the procedure shown in FIG. 7 in an equivalent manner.

(Equivalent Modification #1)

Figure 9:
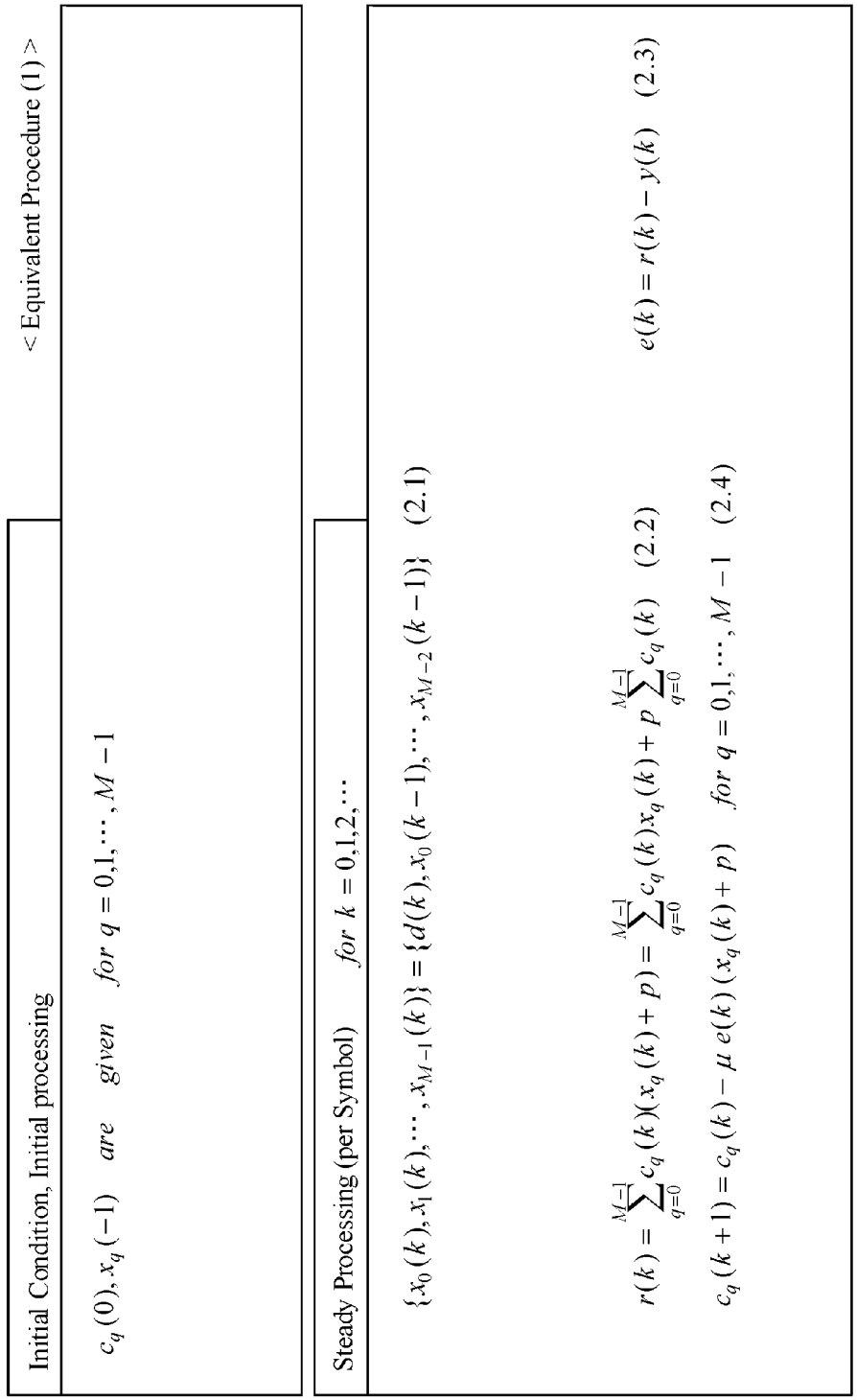
FIG. 9 is a figure showing a procedure that is equivalent modification of the procedure shown in FIG. 7.

The procedure shown in FIG. 7 may be equivalently modified into the procedure shown in FIG. 9 by estimation of the symbols that are transmitted before adding the DC offset. In other words, the addition of p to d(k) in Equation (1.1) is eliminated, and instead addition of p is performed in the sum of products calculation by using Equation (2.2) and in the coefficient updating by using Equation (2.4).

(Equivalent Modification #2)

The second term on the right side of Equation (2.2) is one in which the sum total of the coefficients is multiplied by p. A large amount of calculation is required for calculating the sum total of the coefficients for each symbol. In order to eliminate this labor, the sum total of the coefficients is termed Sc, and this is calculated recursively. As a result, the procedure shown in FIG. 9 is equivalently modified into the procedure shown in FIG. 10. Here, Equation (3.5) represents the recursive calculation of Sc. Note that the initial value of Sc is calculated according to Equation (3.6). This calculation of the initial value needs only to be performed once. Accordingly, the increase in the amount of calculation is slight.

(Equivalent Modification #3)

If Sx is defined as being the sum total of the tap data, the procedure shown in FIG. 10 may be equivalently modified into the procedure shown in FIG. 11.

(Equivalent Modification #4)

A large amount of calculation is required for calculating Sx according to Equation (4.7) for each symbol. In order to eliminate this, Sx may be calculated recursively. As a result, the procedure shown in FIG. 11 is equivalently modified into the procedure shown in FIG. 12. Here, Equation (5.7) gives the recursive calculation of Sx. It should be understood that the initial value of Sx is calculated according to Equation (5.8).

(Equivalent Modification #5)

When attention is directed to the second term on the right side of Equation (5.4), it will be understood that this coefficient has two components, i.e. a component $a_q$ that is updated according to the tap data, and a component b that is updated according to the DC offset. As a result, the procedure shown in FIG. 12 is equivalently modified into the procedure shown in FIG. 13. Here, Equation (6.4) represents the update for $a_q$, while Equation (6.9) represents the update for b. Moreover, the initial value of b is zero, and the initial value of $a_q$ is $c_q$.

(Equivalent Modification #6)

Figure 15:
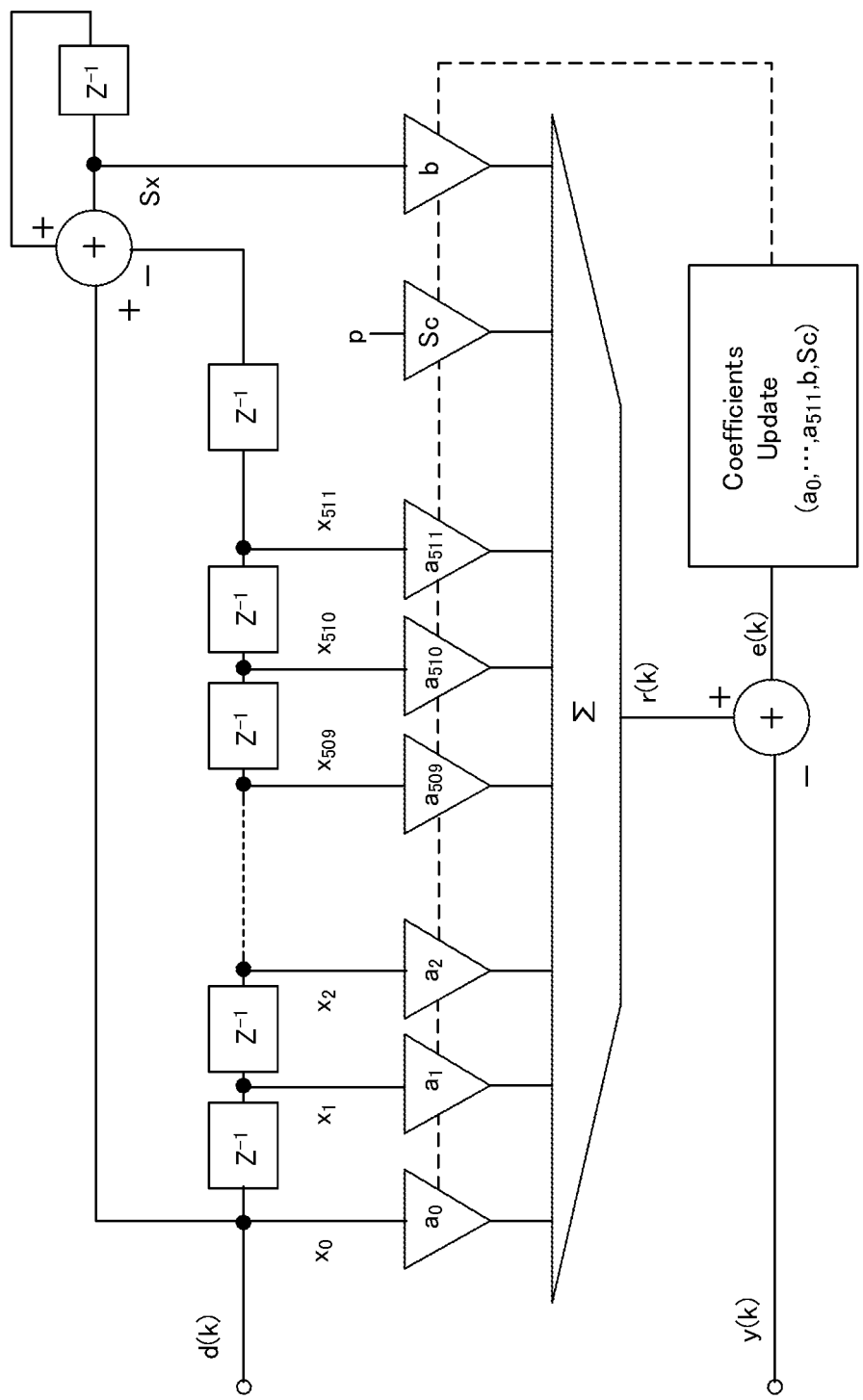
FIG. 15 is a figure showing a configurational example when the procedure shown in FIG. 14 has been implemented by hardware.

When the procedure shown in FIG. 13 is rearranged, the procedure shown in FIG. 14 is obtained (hereinafter termed the "invented procedure"). This invented procedure is equivalent to the procedure shown in FIG. 7 (hereinafter termed the "prior art procedure"). In other words, the r(k) obtained by the invented procedure is the same as the r(k) obtained by the prior art procedure. For reference, an example of the configuration is shown in FIG. 8, when the invented procedure is implemented in hardware (i.e. with logic circuits) is shown in FIG. 15. Note that the procedure shown in FIG. 15 is one which corresponds to claims 7 through 9.

In the invented procedure, Equation (7.0), Equation (7.1), Equation (7.3), and Equation (7.4) are processing similar to that performed by an adaptive FIR filter when no DC offset is present, and do not require a large amount of calculation. That is to say, since the required accuracy of the tap data is able to achieve with the small number of bits, the multiplication M times that is included in the sum of products calculation using Equation (7.0) requires a smaller amount of calculation than the case of the calculation using either Equation (1.2) or Equation (2.2). In a similar manner, the multiplication M times that is included in the coefficient updating of Equation (7.4) requires a smaller amount of calculation than the calculation using either Equation (1.4) or Equation (2.4).

On the other hand, in the invented procedure, the processing of Equation (7.7), Equation (7.2), Equation (7.9), and Equation (7.5) is added, as compared with the prior art procedure. However, since these processes do not grow in proportion to the tap number M, accordingly the increase in the amount of calculation is relatively slight.

Note that, in the invented procedure, the coefficient $c_q$ is not calculated directly. Accordingly, when $c_q$ is required, it is necessary to calculate it as the sum of $a_q$ and b. However, the amount of calculation is small, because the addition processing does not need to be performed for each symbol. In concrete terms, the addition processing need only to be performed at the time point that the estimation of CIR becomes necessary. For example, with the example of a receiver for ATSC described above, it is only necessary to perform the addition processing once for each segment (of 832 symbols).

The implementation of the invented procedure can be done in many ways. As one example, it may be considered to implement the invented procedure by using a logic circuit including dedicated LSI or FPGA. In this case, by building a logic circuit corresponding to the invented procedure, it is possible to anticipate reduction of the scale of the circuitry for the multipliers that perform the corresponding multiplications included in Equation (7.0) and Equation (7.4). Moreover, reduction of the bit width of the registers for storing the tap data may also be anticipated.

As another example of a method of implementation, it may be considered to implement the present invention as a program for a DSP or a CPU. In this case, since it is possible, by constructing the program according to the invented procedure, to manage with a data format having a lesser number of bits than the data format allocated to the tap data. Accordingly, it is possible to anticipate advantageous effects with regard to reduction of the amount of memory used, reduction of the consumption of resources due to execution of the program, enhancement of the speed of program execution, and so on.

(Modified Embodiment #1)

Figure 17:
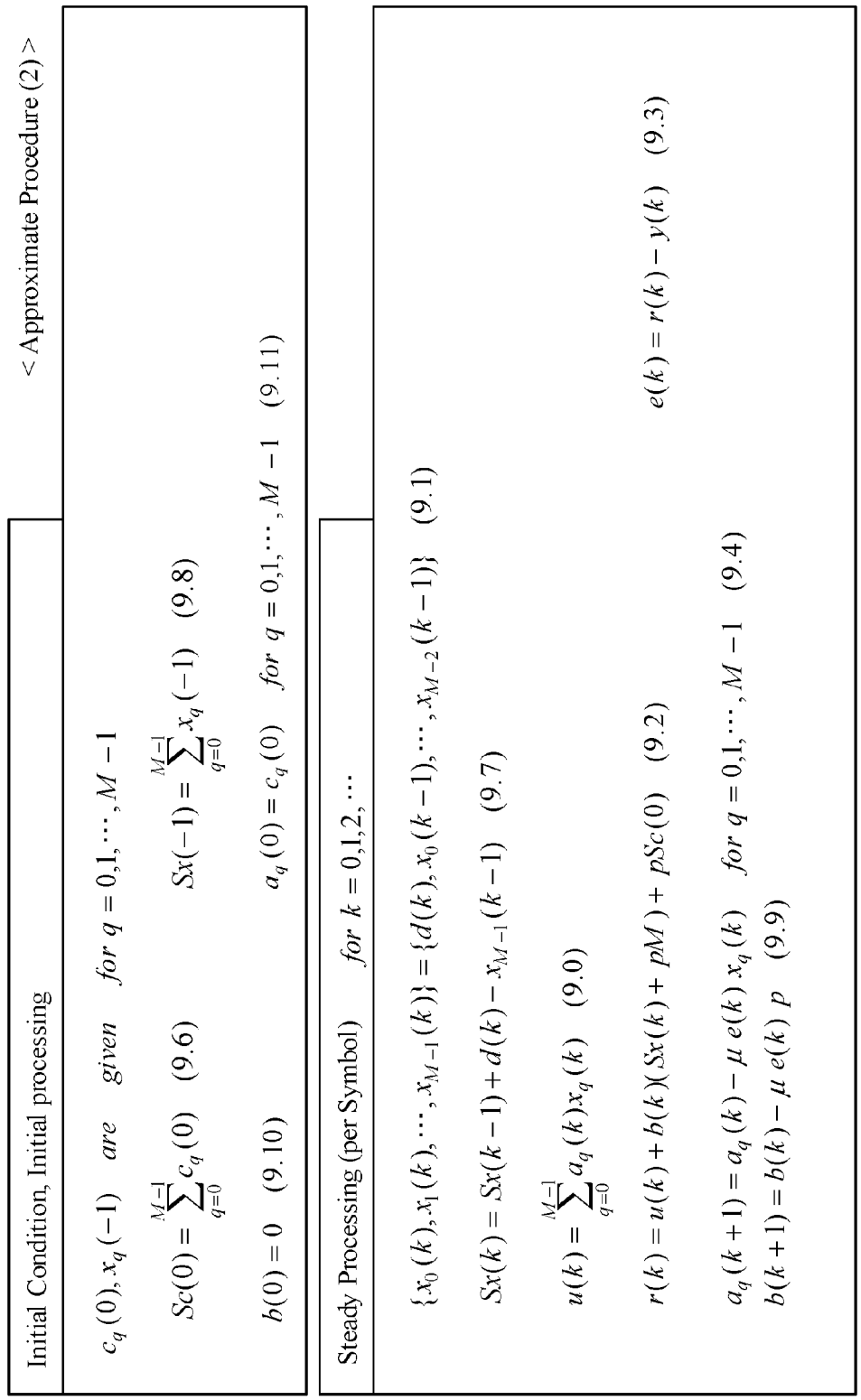
FIG. 17 is a figure showing a procedure that is equivalent modification of the procedure shown in FIG. 16.

It is possible to reduce the amount of calculation further by making a slight approximation in the procedure shown in FIG. 14. In concrete terms, Sx that is included in the second term on the right hand side of Equation (7.5) is approximated as being zero. If the absolute value of Sx is sufficiently small as compared with pM, then the influence of the approximation is small. With the approximation, the procedure shown in FIG. 16 is obtained as an alternative to the procedure shown in FIG. 14. Here, if attention is paid to the resemblance between Equation (8.5) and Equation (8.9), then it will be understood that Sc(k)=Sc(0)+b(k)M. By substituting this into Equation (8.2), the procedure shown in FIG. 16 is equivalently modified into the procedure shown in FIG. 17. Furthermore, if attention is paid to the fact that pM is a constant in the addition (Sx(k)+pM} that is included in the second term on the right hand side of Equation (9.2), then the order of this addition can be shifted to the initial stage. As a result, the procedure shown in FIG. 17 is equivalently modified into the procedure shown in FIG. 18.

(Modified Embodiment #2)

Since pSc(0) in the third term on the right side of Equation (10.2) in the procedure shown in FIG. 18 is a constant, accordingly it can be calculated in advance. In a similar manner, since μp in Equation (10.9) is a constant, accordingly it can be calculated in advance. In consideration of the above points, the procedure shown in FIG. 18 is equivalently modified into the procedure shown in FIG. 19. Note that the modified embodiment #2 is corresponding to claims 5 and 6.

(Modified Embodiment #3)

If it is desired further to reduce the amount of calculation, it would also be possible to approximate Dc(0) in Equation (11.2) to zero. In this case, the performance in the initial stage (i.e. in the interval where k is small) is slightly deteriorated; in other words, deterioration of the CIR estimation accuracy takes place. However the influence of this is extremely small after a sufficient period of time has elapsed. Note that the modified embodiment #3 is corresponding to claim 4.

The invention claimed is:

1. A channel estimation device to which a received signal of a digitally modulated wave upon which a predetermined DC component is superimposed is inputted, comprising:
   a sum of products calculation unit performing sum of products calculation of a predetermined plural tap number of items of tap data and a same predetermined plural tap number of coefficients;
   a tap sum total calculation unit calculating a sum total of said predetermined plural tap number of items of tap data;
   a replica calculation unit calculating a replica signal on the basis of a sum of products calculation result, said sum total of said predetermined tap number of items of tap data, and a correction coefficient;

a residual calculation unit calculating a residual signal as the difference between said replica signal and said received signal;

a coefficient updating unit updating said predetermined plural tap number of coefficients on the basis of said predetermined plural tap number of items of tap data and said residual signal; and a correction coefficient calculation unit calculating said correction coefficient on the basis of said residual signal, wherein said tap data is either a data symbol before superimposition of said DC component, or an evaluation thereof.

2. The channel estimation device according to claim 1, further comprising:

a coefficient correction unit performing addition of the correction coefficient to each of said predetermined plural tap number of coefficients.

3. A receiving device, comprising a channel estimation device according to claim 2.

4. The channel estimation device according to claim 1, wherein said correction coefficient calculation unit calculates said correction coefficient as a constant times a cumulative sum of said residual signal, or as a cumulative sum of a constant times said residual signal.

5. A receiving device, comprising a channel estimation device according to claim 4.

6. The channel estimation device according to claim 1, wherein said replica calculation unit calculates said replica signal r according to the following Equation (I):

$$r = b \cdot (Sx + p \cdot M) + u \ldots \quad (I)$$

where:
u: said sum of products calculation result;
b: said correction coefficient;
Sx: the sum total of said tap data;
p: said predetermined DC component;
M: said predetermined plural tap number.

7. A receiving device, comprising a channel estimation device according to claim 6.

8. The channel estimation device according to claim 1, wherein taking an offset value as Dc, said replica calculation unit calculates said replica signal r according to the following Equation (II):

$$r = Dc + b \cdot (Sx + p \cdot M) + u \ldots \quad (II)$$

where:
u: said sum of products calculation result;
b: said correction coefficient;
Sx: the sum total of said tap data;
p: said predetermined DC component;
M: said predetermined plural tap number.

9. The channel estimation device according to claim 8, wherein said offset value is calculated as a sum total of initial values of said predetermined plural tap number of coefficients and said predetermined DC component.

10. A receiving device, comprising a channel estimation device according to claim 9.

11. A receiving device, comprising a channel estimation device according to claim 8.

12. The channel estimation device according to claim 1, further comprising:

a coefficient sum total calculation unit calculating a coefficient sum total, wherein said replica calculation unit calculates said replica signal on the basis of said coefficient sum total further.

13. The channel estimation device according to claim 12, wherein said coefficient sum total calculation unit, by cumulatively adding a constant times said residual signal to a coefficient sum total at a time point, calculates a coefficient sum total at the next time point recursively.

14. A channel estimation device according to claim 12, wherein said replica calculation unit calculates said replica signal r according to the following Equation (III):

$$r = p \cdot Sc + b \cdot Sx + u \ldots \quad (III)$$

where:
u: said sum of products calculation result;
b: said correction coefficient;
Sx: the sum total of said tap data;
p: said predetermined DC component;
Sc: said coefficient sum total.

15. The channel estimation device according to claim 1, wherein the digital modulation is DC pilot type superimposed VSB modulation.

16. The channel estimation device according to claim 1, wherein the digital modulation is DC pilot superimposed type QAM modulation.

17. The channel estimation device according to claim 1, wherein the digital modulation conforms to the ATSC standard.

18. A receiving device, comprising the channel estimation device according to claim 1.

19. A channel estimation method that is used by a channel estimation device to which a received signal of a digitally modulated wave upon which a predetermined DC component is superimposed is inputted, the channel estimation method comprising the steps of:

performing a sum of products calculation of a predetermined plural tap number of items of tap data and a same predetermined plural tap number of coefficients;

calculating a sum total of said predetermined plural tap number of items of tap data;

calculating a replica signal on the basis of a sum of products calculation result, said sum total of said predetermined plural tap number of items of tap data, and a correction coefficient;

calculating a residual signal as the difference between said replica signal and said received signal;

updating said predetermined plural tap number of coefficients on the basis of said predetermined plural tap number of items of tap data and said residual signal; and calculating said correction coefficient on the basis of said residual signal, wherein said tap data is either a data symbol before superimposition of said DC component, or an estimation thereof.

20. A non-transient computer readable medium having recorded thereon a channel estimation program that, when executed, causes a computer in a channel estimation device, to which is inputted a received signal of a digitally modulated wave upon which a predetermined DC component has been superimposed, to execute the diversity reception method according to claim 19.

* * * * *